United States Patent [19]

Koehler et al.

[11] 4,246,364
[45] Jan. 20, 1981

[54] PROCESS FOR POLYISOCYANURATE FOAMS BASED ON AN AMIDE-DIOL BLEND

[75] Inventors: Charles E. Koehler, Baytown; Thomas R. McClellan, Seabrook; Pat L. Murray, Houston, all of Tex.

[73] Assignee: The Upjohn Company, Kalamazoo, Mich.

[21] Appl. No.: 122,029

[22] Filed: Feb. 19, 1980

Related U.S. Application Data

[63] Continuation-in-part of Ser. No. 47,030, Jun. 11, 1979, abandoned.

[51] Int. Cl.³ .................. C08G 18/14; C08G 18/38; C08G 18/76; C09K 3/00
[52] U.S. Cl. .................. 521/167; 252/182; 521/160
[58] Field of Search ............... 521/160, 167, 902; 252/182

[56] References Cited
U.S. PATENT DOCUMENTS

| | | | |
|---|---|---|---|
| 3,072,582 | 1/1963 | Frost | 521/167 |
| 3,288,732 | 11/1966 | Chapman | 521/167 |
| 3,297,582 | 1/1967 | Pawlyk | 521/167 |
| 3,516,950 | 6/1970 | Haggis | 521/167 |
| 3,578,612 | 5/1971 | Burba et al. | 521/167 |
| 3,637,540 | 1/1972 | Wolff et al. | 521/167 |
| 3,745,133 | 7/1973 | Communale et al. | 521/156 |
| 3,903,346 | 9/1975 | DeLeon et al. | 428/322 |
| 3,986,991 | 10/1976 | Kolakowski et al. | 521/117 |
| 4,003,859 | 1/1977 | Reymore et al. | 521/114 |

Primary Examiner—H. S. Cockeram
Attorney, Agent, or Firm—James S. Rose; Denis A. Firth

[57] ABSTRACT

Disclosed are novel polyol blends comprising from about 20 percent to about 85 percent by weight of said blend of an amide diol, or mixture of amide diols selected from the formula

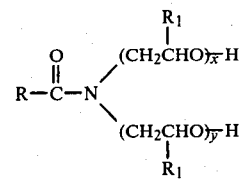

wherein R is an aliphatic radical having from 7 to 17 carbon atoms, inclusive, each $R_1$ is independently selected from the group consisting of hydrogen or methyl, x and y each independently have an average value from about 1 to about 3 inclusive; and from about 15 percent to about 80 percent by weight of a primary hydroxyl polyol characterized by a molecular weight of from about 60 to about 1000.

The polyol blends are miscible with fluorocarbon blowing agents and water and other adjuvants including trimerization catalysts.

The novel blends are particularly useful in an improved process for the preparation of polyisocyanurate foams. The foams are characterized by high reaction exotherms making such foams particularly suited to the preparation of polyisocyanurate foam laminates.

20 Claims, No Drawings

PROCESS FOR POLYISOCYANURATE FOAMS BASED ON AN AMIDE-DIOL BLEND

CROSS-REFERENCE TO RELATED APPLICATION

This application is a continuation-in-part of pending application Ser. No. 47,030 filed June 11, 1979, now abandoned.

BACKGROUND OF THE INVENTION

1. Field of the Invention

This invention relates to cellular polymers and intermediates therefor and is more particularly concerned with novel polyol blends and their use in a process for the preparation of cellular polyisocyanurates.

2. Description of the Prior Art

Cellular polyisocyanurate polymers are well known in the art for their use in various types of thermal insulating applications. They are also well known for their ability to withstand heat and flame; see U.S. Pat. Nos. 3,745,133, 3,986,991, and 4,003,859. Minor amounts of polyols are sometimes added to the foam forming ingredients to modify the foam properties. When fluorocarbon blowing agents are employed the problem of the incompatibility that may arise between the polyol, particularly primary hydroxyl polyols, and fluorocarbon in resin premixes is generally solved by premixing most, if not all, the fluorocarbon with the polyisocyanate; see the patents cited supra.

Polyisocyanurate foams find particular utility in the production of laminated foam board stock material which can be prepared with a variety of different facer materials. Problems which can arise in the production of such laminate material include (1) lack of uniform foam core strength; (2) poor adhesion between foam core and facer material; (3) maintaining good fire resistance in the foam; and (4) keeping foam friability at low levels. These problems have been overcome in the art by employing minor amounts of low equivalent weight polyols, particularly diols, in the formulation, combined with the heating of the formed laminate product in an oven at 160° to 190° F.; see U.S. Pat. No. 3,903,346.

However, the low equivalent weight polyols employed, particularly the preferred diols (see column 4, lines 59-61 of U.S. Pat. No. 3,903,346) having only primary hydroxyl groups, cannot be blended beforehand with the fluorocarbon blowing agent in a "B" side component because of the low solubility of the diol-fluorocarbon pair. This necessitates the blending of the fluorocarbon with the polyisocyanate in the "A" side component. Further, because of the fluorocarbon diol immiscibility, the above patent teaches that a third component "C" is required which contains the catalyst constituent dissolved in a low molecular weight glycol; see column 2, lines 32-33 and the examples of 3,903,346.

Furthermore, a laminate prepared in accordance with the patent noted above must be heated in an oven to provide a product having uniform foam core strength.

Surprisingly, it has been found that high levels of fluorocarbon blowing agent are completely miscible with low molecular weight polyols containing primary hydroxyl groups when novel blends comprising a certain type of amide diol with the primary hydroxyl polyols are employed. Additional ingredients which can be present in the miscible blends are surfactants, catalysts and the like.

Further, it has been found that the same type of miscible primary hydroxyl containing blends as described above, except that water replaces the fluorocarbon component, can be obtained.

Furthermore, it has been discovered that the novel polyol blends above can be employed in minor amounts as a B type component to prepare polyisocyanurate foams characterized by low friability, fine cell structure, good dimensional stability, and low flame spread, via a two-component, i.e., an A, and a B side, process. The fluorocarbon and water components act as the blowing agents in their respective foam forming formulations.

Further, the amide diol referred to above can be employed as the sole diol ingredient in combination with the blowing agent, catalyst, surfactant, and other adjuvants to provide polyisocyanurate foams in accordance with the present invention.

Quite unexpectedly, the presence of the amide diol in the B side gives rise to excellent reactant compatibility between the polyisocyanate and the other ingredients. This gives rise in turn to faster reactivity compared to prior art foams and very good reaction exotherm. The high exotherm is of particular advantage when foam laminates are being prepared because it will result in excellent adhesion between foam and facer material thereby eliminating the need of heating the formed laminate in an oven.

SUMMARY OF THE INVENTION

This invention comprises polyol blends comprising from about 20 percent to about 85 percent by weight of said blend of an amide diol, or mixture of amide diols selected from the formula

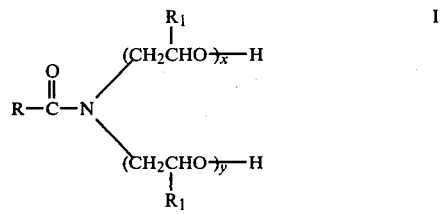

wherein R is an aliphatic radical having from 7 to 17 carbon atoms, inclusive, each $R_1$ is independently selected from the group consisting of hydrogen and methyl, x and y each independently have an average value from about 1 to about 3 inclusive; and from about 15 percent to about 80 percent by weight of a primary hydroxyl polyol (II) characterized by a molecular weight of from about 60 to about 1000.

This invention also comprises miscible blends arising from the above polyol blends in combination with a fluorocarbon or water blowing agent.

This invention also comprises miscible blends arising from the above polyol blends in combination with a fluorocarbon or water blowing agent and an isocyanate trimerization catalyst.

The invention also comprises a process for the preparation of polyisocyanurate cellular polymers which utilizes, as a blended component, the diol (I) above in combination with a fluorocarbon or water blowing agent and a trimerization catalyst, and, preferably, the blended component additionally containing the polyol (II), in the reaction with an organic polyisocyanate.

The invention also comprises the cellular polymers produced in accordance with the above process.

The term "aliphatic radical" means alkyl and alkenyl having from 7 to 17 carbon atoms inclusive. Representative of alkyl are heptyl, octyl, decyl, dodecyl, tetradecyl, hexadecyl, heptadecyl, and isomeric forms thereof. Representative of alkenyl are heptenyl, octenyl, decenyl, dodecenyl, tetradecenyl, hexadecenyl, heptadecenyl, and isomeric forms thereof.

The polyol blends in accordance with the present invention can be used as the polyol ingredients in the preparation of polyurethane foams. Polyurethane foams are well known in the art for their use in a wide variety of applications including thermal and sound insulation for both industrial and residental buildings.

The polyol blends find particular utility, as set forth herein, as minor constituents in the preparation of polyisocyanurate foams particularly those polyisocyanurate foams prepared in foam laminate machinery and by spray foam equipment. Such foams are well known for their heat and fire resistance and are used in making laminate boards and foam bun stock which are both used in building construction for thermal and sound insulation.

DETAILED DESCRIPTION OF THE INVENTION

The polyol blends in accordance with the present invention are prepared simply by mixing together, in the proportions by weight set forth above, the amide diol (I) and primary hydroxyl polyol (II) defined above, in any suitable mixing vessel, holding tank, storage vessel, or the like. Preferably, the amide diol (I) is employed within a range of from about 25 percent to about 60 percent by weight of the blend while the primary hydroxyl polyol is employed within a range of from about 40 percent to about 75 percent by weight.

A preferred amide diol has the formula corresponding to (I) wherein both $R_1$ groups are hydrogen and x and y each independently have an average value from about 1 to about 3, inclusive.

The amide diols (I) are prepared using standard reactions known to those skilled in the art. Typically, they can be prepared by reacting the appropriate dialkanolamine with the appropriate fatty acid, fatty acid ester, or fatty acid chloride according to the following equation

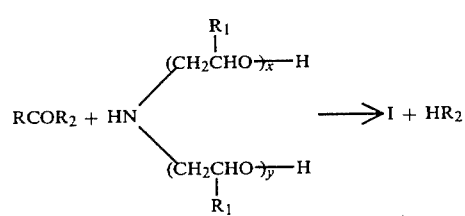

wherein R, $R_1$, x, and y have the same definition as above and $R_2$ represents —OH, —$OR_3$, and X wherein $R_3$ represents any typical esterifying group such as lower alkyl, aryl, cycloalkyl, and the like, and X is halogen preferably chlorine or bromine. In the event that diethanolamine or diisopropanolamine or a mixture thereof is the starting dialkanolamine, and it is desired to obtain amide diols in which the values of x and y are greater than 1, then the intermediate dialkanolamide is simply reacted in a one molar proportion with from about 1 to about 4 moles of ethylene oxide or propylene oxide, or mixtures thereof. See Bulletin 1295, entitled Varamide Alkanolamides, Ashland Chemical Company, Division of Ashland Oil, Inc., Box 2219, Columbus, Ohio 43216 for a detailed teaching of the preparation of fatty acid dialkanolamides.

Preferably, the amide diols (I) are prepared by converting the fatty acids to the corresponding fatty acid amides ($RCONH_2$) and reacting the amide with from about 1 to about 6 moles, per mole of amide, of ethylene oxide or propylene oxide, or mixtures thereof.

Illustrative of the starting fatty acids (from which the corresponding esters, acid halides, and amides are also derived) are caprylic, capric, lauric, myristic, palmitic, stearic, and isomeric forms thereof. Illustrative of the unsaturated fatty acids are decylenic, dodecylenic, palmitoleic, oleic, linoleic, and isomeric forms thereof. Further illustrative of said fatty acids are mixtures, for example, the fatty acid mixture derived from coconut oil which consists of the following mixture in approximate percent proportions by weight: 8.0% caprylic, 7.0% capric, 48.0% lauric, 17.5% myristic, 8.2% palmitic, 2.0% stearic, 6.0% oleic, and 2.5% linoleic; the fatty acid mixture from soybean oil: 6.5% palmitic, 4.2% stearic, 33.6% oleic, 52.6% linoleic, and 2.3% linolenic; and the fatty acid mixture from tallow: 2% myristic, 32.5% palmitic, 14.5% stearic, 48.3% oleic, and 2.7% linoleic. Further illustrative of the starting fatty acids are the halogenated fatty acids, particularly the chlorinated and brominated fatty acids, which, illustratively, can be made by the chlorination or bromination of the coconut, soybean, and tallow fatty acid mixtures described above.

A particularly preferred group of starting fatty acids and fatty acid amide intermediates consists of the coconut, soybean, and tallow oil mixtures described above and the corresponding cocoamide, soyamide, and tallow amide mixtures. Preferred members of this group are the coconut oil mixture and its cocoamide mixture derivative.

A preferred group of amide diols (I) are the cocoamide diol, soyamide diol, and tallow amide derived diol mixtures wherein each $R_1$ is H and both x and y have a value of about 3. A preferred species within this group of amide diols is the cocoamide diol mixture above and identified by the chemical name of N,N-bis(8-hydroxy-3,6-dioxaoctyl)cocoamide mixture.

The primary hydroxyl polyol (II) can be any primary hydroxyl polyol having a molecular weight of from about 60 to about 1000, preferably from about 60 to about 800, and most preferably from about 60 to about 600. Included in the polyols (II) are diols, triols, and tetrols. The preferred polyols are diols.

Included in the class of primary hydroxyl containing polyols are the various primary hydroxyl containing diols, triols, and tetrols disclosed in U.S. Pat. No. 3,745,133 which meet the molecular weight limitations set forth above and whose disclosure with respect to said polyols is incorporated by reference herein. The preferred classes are the polyester polyols prepared from dibasic carboxylic acids and polyhydric alcohols including those based on chlorendic anhydride, alkylene diols, alkoxyalkylene diols, polyalkylene ester diols, polyoxyalkylene ester diols, hydroxyalkylated aliphatic monoamines or diamines, the resole polyols (see Prep. Methods of Polymer Chem. by W. R. Sorenson et al., 1961, page 293, Interscience Publishers, New York, N.Y.), and polybutadiene resins having primary hydroxyl groups, (see, Poly Bd Liquid Resins, Product Bulletin BD-3, October 1974, Arco Chemical Company, Div. of Atlantic Richfield, New York, N.Y.).

The most preferred classes are the alkylene diols, lower alkoxyalkylene diols, polyalkylene ester diols, and polyoxyalkylene ester diols.

Illustrative, but not limiting, of the preferred classes of polyols in accordance with the present invention are ethylene glycol, 1,3-propanediol, 1,4-butanediol, glycerine, trimethylolpropane, pentaerythritol; diethylene glycol; the polyoxyethylene glycols prepared by the addition of ethylene oxide to water, ethylene glycol, or diethylene glycol, etc., which provide triethylene glycol, tetraethylene glycol, and higher glycols, or mixtures thereof such that the molecular weight falls within the range set forth above; ethoxylated glycerine, ethoxylated trimethylolpropane, ethoxylated pentaerythritol, and the like; bis($\beta$-hydroxyethyl)terephthalate, bis($\beta$-hydroxyethyl)phthalate, and the like; polyethylene succinate polyethylene glutarate, polyethylene adipate, polybutylene succinate, polybutylene glutarate, polybutylene adipate, copolyethylenebutylene succinate, copolyethylenebutylene glutarate, copolyethylenebutylene adipate, and the like hydroxy terminated polyesters; polyoxydiethylene succinate, polyoxydiethylene glutarate, polyoxydiethylene adipate, polyoxydiethylene adipate glutarate, and the like hydroxy terminated polyesters; diethanolamine, triethanolamine, N,N'-bis($\beta$-hydroxyethyl)aniline, and the like.

The most preferred diols are diethylene glycol, and the polyoxydiethylene adipate glutarate polyester diols having a molecular weight from about 400 to about 600.

Particularly preferred are blends of from about 30 percent to about 50 percent by weight of diethylene glycol with from about 50 percent to about 70 percent by weight of a polyoxydiethylene adipate glutarate polyester diol having a molecular weight from about 400 to about 600.

In the preferred polyol blends in accordance with the present invention a fluorocarbon or water blowing agent is also present in the blend with the fluorocarbon being the preferred blowing agent.

When the blowing agent is a fluorocarbon the unexpected and advantageous features of the polyol blends of (I) and (II) can be realized fully. Accordingly, there can be obtained miscible polyol blends comprising at least about 20 percent by weight of a fluorocarbon blowing agent and the balance being a polyol blend of (I) and (II) within the proportions set forth above.

Surprisingly, there are obtained miscible polyol blends comprising from at least about 20 percent by weight to at least about 60 percent by weight of a fluorocarbon blowing agent, the corresponding 80 percent to about 40 percent by weight being the polyol blend of (I) and (II). The particular percentage of fluorocarbon to be dissolved in the blend will govern the proportions of (I) and (II) to be employed in any given instance and these proportions, falling within the range set forth above, can be easily determined by one skilled in the art by trial and error methods.

Even more surprising is the fact that miscible polyol blends comprising greater than 60 percent by weight of fluorocarbon can be readily obtained with the blends of (I) and (II) within the proportions set forth above in accordance with the present invention. Generally speaking, the lower the molecular weight of the primary hydroxyl polyol (II) the greater is the amount of fluorocarbon which can be dissolved in the blend at a given proportion of polyol (II) as opposed to a blend with a polyol (II) of higher molecular weight at the same proportion. In this connection, the alkylene diols, and lower alkoxyalkylene diols having molecular weights of less than 400 are preferred polyols of formula (II) with the latter lower alkoxyalkylene diols being most preferred.

The particular proportions of polyol (I) to polyol (II) to be employed in any particular polyol blend to obtain maximum miscibility with fluorocarbon can be determined by a process of trial and error.

When water is the blowing agent it is present in the proportion of from about 1 percent to about 6 percent, preferably from about 2 to about 5 percent by weight with the balance of 94 percent to 99 percent and preferably 95 to 98 percent comprising (I), and (II).

The fluorocarbon blowing agent can be any of the fluorocarbons known to those skilled in the art and which can be used for blowing polymer mixtures into cellular polymers. Generally speaking, such blowing agents are halogenated aliphatic hydrocarbons which are also substituted by chlorine and/or bromine in addition to the fluorine content and are well known to those skilled in the art; see U.S. Pat. No. 3,745,133, column 11, lines 25 to 38 which disclosure relating to fluorocarbon blowing agents is incorporated by reference herein.

In a preferred embodiment of a polyol blend in accordance with the present invention which finds particular utility in the preparation of polyisocyanurate foams, there is additionally present in the blend of blowing agent and components (I) and (II), an isocyanate trimerization catalyst. The isocyanate trimerization catalyst component will be discussed in detail below. The isocyanate trimerization catalyst is advantageously present in the proportions of from about 2 to about 20, preferably from about 2 to about 15 weight percent with the balance of about 80 to about 98, preferably about 85 to 98 percent comprising the blend of (I), (II), and blowing agent set forth above.

Surprisingly, the blowing agent and the polyol blend which includes the primary hydroxyl containing polyols are completely miscible in each other with no separation occurring upon storage, which miscibility is due to the presence of the amide diol (I). Aside from the advantages arising from having a stable, miscible blend of primary hydroxyl polyol and fluorocarbon or water, the beneficial effects of having the amide diol present as a minor constituent when preparing polyisocyanurate foams have been noted above.

Other optional additives can be added to the polyol blends without detracting from the miscibility and stability of the blends. Such additives include other optional polyol components such as secondary hydroxyl containing polyols, dispersing agents, cell stabilizers, surfactants, flame retardants, and the like which are commonly employed in the process of the invention.

In the preparation of polyisocyanurate foams in accordance with the present invention, the amide diol (I) described above can be employed as the sole polyol component in admixture with a fluorocarbon or water blowing agent and a trimerization catalyst to form a B side component for reaction with an A side comprised of an organic polyisocyanate.

The percent by weight proportions of the blend ingredients are the same as those set forth above for the proportion of catalyst to be blended with blowing agent and polyol component. That is to say the B blend is comprised of from about 2 to about 20, preferably about 2 to about 15 percent by weight of a trimerization catalyst and from about 80 to about 98, preferably about 85 to 98 percent by weight of amide diol (I) and blowing agent. In the event that a fluorocarbon blowing agent is employed it is present in the proportion of about 20 to about 80, preferably from about 20 to about 50 percent by weight in respect of the amide diol (I), which, accordingly, is present in the proportion of from about 20 to about 80, preferably from about 50 to about 80 percent by weight.

In the event that water is employed as the blowing agent it is present in the proportion of from about 1 to about 6, preferably from about 2 to about 5 percent by weight in respect of the amide diol (I), which, accordingly, is present from about 94 to about 99, preferably, 95 to 98 percent by weight.

The B side blend is advantageously employed in an amount falling within the range of from about 10 parts to about 120 parts, preferably from about 10 to about 80 parts, most preferably from about 20 parts to about 60 parts by weight per equivalent of polyisocyanate; provided the total hydroxyl equivalents present in said blend (B) are within a range of from about 0.05 to about 0.5 equivalent, preferably about 0.08 to about 0.4 equivalent, per equivalent of said polyisocyanate.

Preferably, there is also present in the B side blend a minor amount of the primary hydroxyl polyol (II) described above. This combination in the blend not only gives rise to the stabilized miscible blends discussed above, but, additionally provides polyisocyanurate foams having the optimum advantageous properties discussed above, including the preparation of foam laminates which require no oven heating in order to achieve maximum foam strength and adhesion to the laminate facers.

The blend containing the amide diol (I), primary hydroxyl polyol (II), blowing agent, and trimerization catalyst is also employed in an amount falling within the same range of parts per isocyanate equivalent set forth above for the B blend containing only the amide diol (I); and with the same proviso set forth above for the range of total hydroxyl equivalents per equivalent of isocyanate. The proportions of each ingredient in the blend in percent by weight of the blend are the same proportions set forth in the description of the polyol blends. The amide diol (I), primary hydroxyl polyol (II) and blowing agent, all have the same significance and scope set forth above.

The trimerization catalyst employed can be any catalyst known to those skilled in the art which will catalyze the trimerization of an organic isocyanate compound to form the isocyanurate moiety. Further, a combination of urethane forming catalyst and trimerization catalyst can be employed if desired.

For typical isocyanate trimerization catalysts see The Journal of Cellular Plastics, November/December 1975, page 329; U.S. Pat. Nos. 3,745,133, 3,896,052, 3,899,443, 3,903,018, 3,954,684, and 4,101,465, the disclosures of these references being hereby incorporated by reference herein.

Preferred as catalysts are the ones disclosed in U.S. Pat. Nos. 3,896,052, and 4,101,465. The former reference discloses the catalyst combination of (a) an alkali metal salt of an N-substituted amide with (b) an alkali metal salt of an N-(2-hydroxyphenyl)methyl glycine and optionally (c) a tertiary amine trimerization catalyst. The latter reference discloses the combination of the same (a) and (b) components above with a hydroxyalkyltrialkylammonium carboxylate salt component.

The organic polyisocyanates which can be employed in the preparation of the polyisocyanurate foams in accordance with the present invention can be any of the organic polyisocyanates conventionally employed in the art for this purpose previously. Advantageously, and in order to obtain foams having exceptionally high heat resistance and structural strength, the preferred polyisocyanates are the polymethylene polyphenyl polyisocyanates, particularly those set forth in U.S. Pat. No. 3,745,133 whose disclosure with respect to said isocyanates is incorporated by reference herein. Also preferred are the polymethylene polyphenyl polyisocyanates treated with a minor amount of an epoxy compound to reduce acidic impurities in accordance with U.S. Pat. No. 3,793,362; and the polymethylene polyphenyl polyisocyanates which contain high levels of the 2,4'-isomer as typically disclosed in U.S. Pat. No. 3,362,979.

A most preferred organic polyisocyanate is a mixture containing from about 30 percent to about 85 percent by weight of methylenebis (phenylisocyanate) and the remainder of said mixture comprises polymethylene polyphenyl polyisocyanates of functionality higher than 2.0.

In carrying out the preparation of polyisocyanurate foams in accordance with the process of the invention, and, in particular, polyisocyanurate foams for the preparation of foam laminates, the procedures and equipment conventional in the art are employed (see patents cited supra); for a detailed teaching of the mode of preparation, and utility of, polyisocyanurate foam laminates see U.S. Pat. No. 3,896,052 whose disclosure relative thereto is incorporated by reference herein.

The following examples describe the manner and process of making and using the invention and set forth the best mode contemplated by the inventors of carrying out the invention but are not to be construed as limiting.

EXAMPLE 1

The following polyisocyanurate foam A was prepared in accordance with the present invention. It was prepared as a hand-mix sample by blending together the A and the B side ingredients (in parts by weight) set forth in Table I below, in a 1 quart cup. The polyisocyanate ingredient was the sole component of the A side while the B side ingredients which are listed in Table I were premixed and observed prior to being reacted with the polyisocyanate. The blending operation was carried out by thoroughly mixing the A and B sides in the cup using a high speed drill press motor equipped with a stirrer blade. The mixture was rapidly poured into a cardboard box and allowed to rise freely and cure at room temperature (circa 20° C.).

The B side was clear without evidence of turbidity in spite of the combination of the fluorocarbon with the primary hydroxyls of the amide diol.

The foam produced was characterized by a very fine cell structure with no surface friability and with a good surface blush. The surface blush in respect of a rising foam sample is the point when the shiny and moist unreacted surface of the rising foam becomes dulled or blushed and indicates that an efficient curing or reaction has occurred at the surface.

The foam exotherm was good and the rapid rise profile indicated the fast reactivity of the foam.

TABLE I

| Foam | A |
| --- | --- |
| Ingredients (pts. by wt.) | |
| A side: | |
| Polyisocyanate I[1] | 135 |
| B side: | |
| Varamide® 6-CM[2] | 49 |
| DC-193[3] | 1.5 |
| Fluorocarbon R-11B | 23 |
| Catalyst I[4] | 3 |
| NCO/OH index | 4.5 |
| B side appearance | clear non-turbid |
| Foam rise time (secs.) | |
| Cream | 8 |
| Gel | 42 |
| Tack free | 52 |
| Rise | — |
| Exotherm (°F.) | 328 |
| Surface friability | none |
| Surface blush | yes |
| Core friability | moderately friable |
| Appearance | very fine cell |

Footnotes to Table I
[1]Polyisocyanate I is a polymethylene polyphenyl polyisocyanate containing about 45 percent by weight of methylenebis(phenyl isocyanate) and the remainder of said mixture consisting of polymethylene polyphenyl polyisocyanates having a functionality greater than 2, the isocyanate equivalent = 135.
[2]Varamide® 6-CM is the cocoamide adduct obtained by the reaction of a 6 molar proportion of ethylene oxide with a 1 molar proportion of cocoamide; amine eq. wt. = 290; OH eq. wt. = 193; supplied by Chemical Products Div., Ashland Chemical Co., Columbus, Ohio.; and otherwise identified by the chemical name of N,N-bis(8-hydroxy-3,6-dioxaoctyl)cocoamide mixture.
[3]DC-193 is a silicone surfactant supplied by Dow Corning, Midland, Mich.; see Bulletin 05-136, Feb., 1966.
[4]Catalyst I comprises a combination in the following proportions of: (A.) 1 part of a solution comprised of 50 percent by weight of sodium N-(2-hydroxy-5-nonylphenyl)methyl-N-methyl glycinate in diethylene glycol; (B.) 0.50 part of potassium acetate; (C.) 0.30 part of water; and (D.) 0.50 part of Varonic® K-215 which is the cocoamine adduct obtained by the reaction of a 15 molar proportion of ethylene oxide with cocoamine; amine eq. wt. = about 885; hydroxyl eq. wt. = about 442; supplied by Chemical Products Div:, Ashland Chemical Co., Columbus, Ohio.

EXAMPLE 2

The following polyisocyanurate Foams B, C, and D were prepared in accordance with the procedure and apparatus described in Example 1 and using the ingredients set forth below in Table II. Foams B and C are in accordance with the present invention while Foam D is not.

The B side components in the case of Foams B and C were clear with no evidence of turbidity in spite of the mixture of the fluorocarbon with the primary hydroxyl containing components in both blends.

The A side of Foam D contained the fluorocarbon blowing agent in accordance with the prior art. When the same amount of the fluorocarbon was mixed into the B side to test miscibility the fluorocarbon separated from the other ingredients, namely, diethylene glycol, surfactant, and catalyst.

A comparison of the foam rise times between Foams B and C on the one hand with Foam D on the other, clearly shows a much faster rate for the foams in accordance with the invention (B and C) over the prior art (D). The dramatic rate increase clearly indicates the increased compatibility between the A and B sides which leads to better reaction between the two hence the faster rise times over the formulations of the prior art.

TABLE II

| Foam | B | C | D |
| --- | --- | --- | --- |
| Ingredients (pts. by wt.) | | | |
| A side: | | | |
| Polyisocyanate I | — | 135 | — |
| Polyisocyanate II[1] | 100 | — | 100 |
| Fluorocarbon R-11B | — | — | 21.5 |
| B side: | | | |
| Polyester diol[2] | — | 9 | — |
| Diethylene glycol | 8 | 6.3 | 8.3 |
| Varamide® 6-CM[3] | 8 | 6.7 | — |
| L-5420[4] | 1.25 | — | 1.25 |
| DC-193 | — | 2 | — |
| Fluorocarbon R-11B | 25 | 22 | — |
| Catalyst I | 4.5 | 5 | — |
| Catalyst II[5] | — | — | 3.0 |
| NCO/OH index | about 4 | about 4 | about 4.6 |
| B side appearance | clear non-turbid | clear non-turbid | — |
| Foam rise time (secs.) | | | |
| Cream | 16 | 16 | 75 |
| Gel | 40 | 35 | 104 |
| Tack free | 45 | 40 | 116 |
| Rise | 54 | 48 | — |
| Exotherm (°F.) | 344 | 351 | 341 |
| Firm rate | rapid | rapid | — |
| Surface friability | none | none | — |
| Surface blush | yes | yes | — |
| Core density (pcf) | 1.55 | 2.06 | 1.76 |
| Core friability (%)[6] | 38.5 | 32.0 | 31 |
| 300° F. Dry Age, Δ Volume %/24 hrs. | +7.4 | +5.0 | +4.6 |

Footnotes to Table II
[1]Polyisocyanate II is a polymethylene polyphenyl polyisocyanate containing about 45 percent by weight of methylenebis(phenyl isocyanate) and the remainder of said mixture consisting of polymethylene polyphenyl polyisocyanate having a functionality greater than 2; the isocyanate eq. = 133.
[2]Polyester diol: a polyoxydiethylene adipate glutarate polyester diol of MW = 500, and OH # = 211.5.
[3]Varamide® 6-CM is the same cocoamide identified in Footnote 2, Table I.
[4]L-5420: A rigid foam silicone surfactant having a hydroxyl number of about 119 supplied by Union Carbide Corp., Tarrytown, N.Y., 10591; see Union Carbide Bulletin F-43565, December, 1971.
[5]Catalyst II comprises a combination in the following proportions of (A.) 1 part of a solution comprised of (a) 45 percent by weight of potassium N-phenyl-2-ethylhexamide, (b) 27 percent ethylene glycol, and (c) 28 percent dimethylformamide; (B.) 3 parts of a solution comprised of 50 percent by weight of sodium N-(2-hydroxy-5-nonylphenyl)methyl-N-methyl glycinate in diethylene glycol; and (C.) 1 part of a solution comprised of 50 percent by weight of 2-hydroxypropyltrimethylammonium formate and 50 percent dipropylene glycol; and (D.) 1 part of a polyethyleneglycol (MW = 200).
[6]Friability: Percent weight loss of samples determined in accordance with ASTM Test Method C-421 over a 10 minute period.

EXAMPLE 3

A series of blends of fluorocarbon R-11B (monfluorotrichloromethane) with three typical primary hydroxyl polyols of the present invention were prepared. The proportions by weight employed, including the amount of cocoamide diol when present, varied according to the values set forth in Table III below. The blends were observed for their miscibility and clearness or their turbidity and separation of the fluorocarbon from solution.

Blends A through D contained diethylene glycol and, in the absence of any amide diol, the maximum fluorocarbon solubility did not reach 20 percent by weight. The addition of 10 percent amide diol (blend B) was not sufficient to impart fluorocarbon solubility at the 20 percent level. It was not until at least 15 percent of amide diol (blend C) did the blend remain clear at 20 percent fluorocarbon, and, obviously, was clear at the 80/20 blend level (blend D).

Blends E through G contained ethylene glycol and at least 20 percent of amide diol was required to maintain a 20 percent fluorocarbon solubility.

Blends G through L were prepared from a polyester diol and it was observed that while 20 percent fluorocarbon solubility was possible with the pure diol that 25 percent was not. When the amide diol level was 20 percent (blends J through L) the highest fluorocarbon level attainable was about 31 percent Blends M through O were observed to have maximum fluorocarbon levels of greater than 90 percent and up to 60 percent by weight for diethylene glycol and the polyester diol respectively when a maximum of 85 percent by weight of amide diol was employed.

Blends P through S were observed to have maximum fluorocarbon solubilities of 55 percent and 45 percent respectively for diethylene glycol and polyester diol when the primary alcohol-amide diol blends were 50/50 percent by weight.

TABLE III

| Blend | A | B | C | D | E | F | G | H | I | J | K | L | M | N | O | P | Q | R | S |
|---|---|---|---|---|---|---|---|---|---|---|---|---|---|---|---|---|---|---|---|
| Ingredients (pts. by wt.) | | | | | | | | | | | | | | | | | | | |
| Diethylene glycol | 100 | 90 | 85 | 80 | — | — | — | — | — | — | — | — | 15 | — | — | — | — | — | — |
| Ethylene glycol | — | — | — | — | 100 | 85 | 80 | — | — | — | — | — | — | — | — | — | — | — | — |
| Polyester diol[1] | — | — | — | — | — | — | — | 100 | — | — | — | — | — | — | — | 50 | 50 | 50 | 50 |
| 6-CM[2] | — | — | — | — | — | — | — | — | — | — | — | — | — | — | — | — | — | — | — |
| Fluorocarbon R-11B | 25 | 10 | 15 | 20 | 25 | 15 | 20 | 25 | 33.3 | 80 | 80 | 80 | 85 | 15 | 15 | 50 | 50 | 50 | 50 |
| % by wt. primary alcohol | 100 | 90 | 85 | 80 | 100 | 85 | 80 | 100 | 100 | 20 | 20 | 20 | 900 | 85 | 166.7 | 125 | 150 | 81.8 | 100 |
| % by wt. amide diol | 0 | 10 | 15 | 20 | 0 | 15 | 20 | 0 | 0 | 80 | 80 | 80 | 15 | 150 | 15 | 50 | 50 | 50 | 50 |
| % by wt. fluorocarbon | 20 | 20 | 20 | 20 | 20 | 20 | 20 | 20 | 25 | 20 | 20 | 20 | 85 | 85 | 85 | 50 | 50 | 50 | 50 |
| Blend appearance | turbid separates | turbid separates | clear | clear | turbid separates | turbid separates | clear | clear | turbid separates | 28.5 clear | 31 just clear | 33.3 turbid separates | 90 clear miscible | 60 clear miscible | 62.5 turbid separates | 55 clear | 60 turbid separates | 45 clear | turbid separates |

Footnotes to Table III
[1] The same polyester diol described in footnote 2 of Table II above.
[2] 6-CM is the same cocoamide identified in footnote 2 of Table I above.

We claim:

1. A polyol blend comprising (i) from about 20 percent by weight to about 85 percent by weight of said blend of an amide diol, or mixture of amide diols having the formula

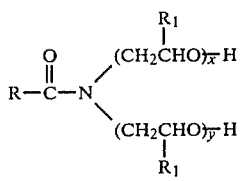

wherein R is an aliphatic radical having from 7 to 17 carbon atoms, inclusive, each $R_1$ is independently selected from the group consisting of hydrogen and methyl, x and y each independently have an average value between about 1 and about 3 inclusive; and (ii) from about 15 percent to about 80 percent by weight of a primary hydroxyl polyol characterized by a molecular weight of from about 60 to about 1000.

2. A miscible polyol blend comprising at least about 20 percent by weight of a fluorocarbon blowing agent and the balance being a polyol blend set forth in claim 1.

3. A polyol blend comprising from about 1 percent to about 6 percent by weight of water and from about 94 percent to about 99 percent by weight of the polyol blend set forth in claim 1.

4. A polyol blend comprising (i) from about 20 percent to about 85 percent by weight of said blend of an amide diol, or mixture of amide diols selected from the formula

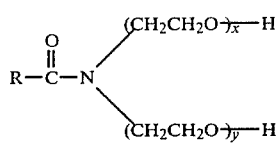

wherein R is an aliphatic radical having from 7 to 17 carbon atoms, inclusive, and x and y each independently have an average value between about 1 and about 3 inclusive; and (ii) from about 15 percent to about 80 percent by weight of a primary hydroxyl polyol having a molecular weight of from about 60 to about 1000.

5. A miscible polyol blend comprising at least about 20 percent by weight of a fluorocarbon blowing agent and the balance being a polyol blend set forth in claim 4.

6. A polyol blend according to claim 4 wherein the primary hydroxyl polyol (ii) is a diol and has a molecular weight of from about 60 to about 800.

7. A polyol blend comprising (i) from about 20 percent to about 85 percent by weight of said blend of an N,N-bis(8-hydroxy-3,6-dioxaoctyl) cocoamide mixture; and (ii) from about 15 percemnt to about 80 percent by weight of a primary hydroxyl diol having a molecular weight of from about 60 to about 800.

8. A polyol blend according to claim 7 wherein the primary hydroxyl diol (ii) is diethylene glycol.

9. A polyol blend according to claim 7 wherein the primary hydroxyl diol (ii) is a polyoxydiethylene adipate glutarate polyester diol having a molecular weight from about 400 to about 600.

10. A polyol blend according to claim 7 wherein the primary hydroxyl diol (ii) comprises a mixture of from about 30 percent to about 50 percent by weight of diethylene glycol and from about 50 percent to about 70 percent by weight of a polyoxydiethylene adipate glutarate polyester diol having a molecular weight from about 400 to about 600.

11. A miscible polyol blend comprising at least about 20 percent by weight of a fluorocarbon blowing agent and the balance being a polyol blend set forth in any one of claims 7, 8, 9, or 10.

12. A polyol blend comprising from about 2 to about 20 percent by weight of an isocyanate trimerization catalyst and from about 80 to about 98 percent by weight of the polyol blend according to claim 2 or 3.

13. In a process for the preparation of a cellular polymer in which the major recurring polymer unit is an isocyanurate moiety said process comprising the trimerization of an organic polyisocyanate in the presence of a minor amount of a polyol, a blowing agent, and a trimerization catalyst, the improvement which comprises preparing said cellular polymer by bringing together:

A. an organic polyisocyanate; and
B. from about 10 to about 120 parts by weight per equivalent of said polyisocyanate of a blend comprising:
  (a) about 2 to about 20 percent by weight of a polyisocyanate trimerization catalyst, and
  (b) about 80 to about 98 percent by weight of a mixture comprising:
    1. about 20 to about 80 percent by weight of a fluorocarbon blowing agent, and
    2. about 20 to about 80 percent by weight of a polyol component comprising an amide diol or mixture of amide diols having the formula

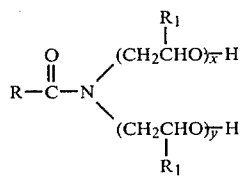

wherein R is an aliphatic radical having from 7 to 17 carbon atoms, inclusive, each $R_1$ is independently selected from the group consisting of hydrogen and methyl, x and y each independently have an average value from about 1 to about 3 inclusive; and provided the total hydroxyl equivalents present in said blend (B) are within a range of from about 0.05 to about 0.5 equivalent per equivalent of said polyisocyanate.

14. In a process for the preparation of a cellular polymer in which the major recurring polymer unit is an isocyanurate moiety said process comprising the trimerization of an organic polyisocyanate in the presence of a minor amount of a polyol, a blowing agent, and a trimerization catalyst, the improvement which comprises preparing said cellular polymer by bringing together:

A. an organic polyisocyanate; and
B. from about 10 to about 120 parts by weight per equivalent of said polyisocyanate of a miscible blend comprising:
  (a) about 2 to about 20 percent by weight of a polyisocyanate trimerization catalyst, and (b) about 80 to about 98 percent by weight of a mixture comprising:
1. at least about 20 percent by weight of a fluorocarbon blowing agent, and
2. the balance being a polyol mixture according to claim 4; and provided the total hydroxyl equivalents present in said blend (B) are within a range of from about 0.05 to about 0.5 equivalent per equivalent of said polyisocyanate.

15. A process according to claim 14 wherein said polyisocyanate is a polymethylene polyphenyl polyisocyanate.

16. A process according to claim 14 wherein said polyol (ii) is a primary hydroxyl diol and has a molecular weight of from about 60 to about 800.

17. A process for the preparation of a cellular polymer in which the major recurring polymer unit is an isocyanurate moiety said process comprising bringing together:
A. a polymethylene polyphenyl polyisocyanate; and
B. from about 10 to about 120 parts by weight per equivalent of said polyisocyanate of a miscible blend comprising:
(a) about 2 to about 20 percent by weight of a polyisocyanate trimerization catalyst, and
(b) about 80 to about 98 percent by weight of a mixture comprising:
1. at least about 20 percent by weight of a fluorocarbon blowing agent, and
2. the balance being a polyol mixture according to claim 7;

provided the total hydroxyl equivalents present in said blend (B) are within a range of from about 0.05 to about 0.5 equivalent per equivalent of said polyisocyanate.

18. A process according to claim 17 wherein the primary hydroxyl diol (ii) is diethylene glycol.

19. A process according to claim 17 wherein the primary hydroxyl diol (ii) is a polyoxydiethylene adipate glutarate polyester diol having a molecular weight from about 400 to about 600.

20. A process according to claim 17 wherein the primary hydroxyl diol (ii) comprises a mixture of from about 30 percent to about 50 percent by weight of diethylene glycol and from about 50 percent to about 70 percent by weight of a polyoxydiethylene adipate glutarate polyester diol having a molecular weight from about 400 to about 600.

* * * * *

UNITED STATES PATENT OFFICE
CERTIFICATE OF CORRECTION

Patent No. 4,246,364      Dated January 20, 1981

Inventor(s) Charles E. Koehler, Thomas R. McClellan and Pat L. Murray

It is certified that error appears in the above-identified patent and that said Letters Patent are hereby corrected as shown below:

Column 1, line 60 "having uniform" should read --having a uniform--. Column 4, line 7 "1 to" should read --2 to--. Column 9, footnotes to Table I, footnote 3, line 29 "Bulletin 05-136" should read --Bulletin 05-146--. Column 15, claim 7, line 58 "15 percemnt" should read --15 percent--.

Signed and Sealed this

*Nineteenth* Day of *May 1981*

[SEAL]

*Attest:*

RENE D. TEGTMEYER

*Attesting Officer*     *Acting Commissioner of Patents and Trademarks*